United States Patent Office 3,740,384
Patented June 19, 1973

3,740,384
POLYMERISATION OF MONO-OLEFINS WITH AN ORGANOMETALLIC ZIRCONIUM COMPLEX-1,1,3,3 - TETRAPHENYLSILOXANE - 1,3 - DIOL CATALYST
Denis George Harold Ballard, Nicholas Heap, Eric Jones, Barry Tarbatt Kilbourn, and Ronald John Wyatt, Runcorn, England, assignors to Imperial Chemical Industries Limited, London, England
No Drawing. Filed Aug. 23, 1971, Ser. No. 174,256
Claims priority, application Great Britain, Sept. 3, 1970, 42,221/70
Int. Cl. C08f 1/58, 3/06
U.S. Cl. 260—94.9 C
16 Claims

ABSTRACT OF THE DISCLOSURE

A process for the polymerisation of mono-olefins, particularly ethylene, in which the olefin is contacted with a catalyst comprising an organometallic zirconium complex, preferably tetrabenzylzirconium, and 1,1,3,3-tetraphenylsiloxane-1,3-diol.

Preferably, the polymerisation is performed in solution.

---

This invention relates to the polymerisation of olefins.

According to the present invention we provide a process for the polymerisation or co-polymerisation of mono-olefins in which the olefin is contacted with a catalyst including an organometallic zirconium complex and 1,1,3,3-tetraphenylsiloxane-1,3-diol ($Ph_2Si(OH)OSi(OH)Ph_2$ where Ph is phenyl).

By "organometallic zirconium complex," we mean a compound of zirconium in which the valence and co-ordination requirements of the metal are at least partially satisfied by one or more hydrocarbon or substituted hydrocarbon groups. These groups may be alkyl, alkenyl (including $\pi$-alkenyl, for example $\pi$-allyl or $\pi$-methallyl), aralkyl, for example benzyl, and substituted derivatives thereof. Suitable complexes thus include tetrakis($\pi$-allyl)- or ($\pi$-methallyl)- zirconium, tetrabenzylzirconium, tetrakis(p-methyl-benzyl)zirconium and tetrakis-1-methylene-1-naphthyl) zirconium. The hydrocarbon groups in the above complexes may be partially replaced by other monovalent ligands, for example, the halides, as in tris-($\pi$-allyl)zirconium chloride, bromide or iodide, and the corresponding $\pi$-methallyl and benzyl compounds.

It is preferred to employ a zirconium complex in which al the ligands are organic ligands, particularly hydrocarbyl ligands. Tetrabenzyl-zirconium is particularly active and is therefore preferred.

The catalysts of our invention may be prepared by reacting the siloxane-diol and the zirconium complex together in liquid solution. Without prejudice to the invention, it is thought that a reaction occurs between the zirconium complex and the siloxanediol involving displacement of one or more hydrocarbon (or substituted hydrocarbon) groups by the hydrogen atom of an —OH group or groups, with liberation of the corresponding free hydrocarbon.

The catalyst compositions of our invention may be prepared by a separate operation prior to commencement of polymerisation by contacting a solution of a zirconium complex with the siloxanediol. Since organometallic zirconium complexes are water sensitive, this operation should be performed under substantially anhydrous conditions. It is desirable, but not essential, for the siloxanediol to be soluble in the reaction medium.

The solvent used for the zirconium complex should be dry and inert; hydrocarbon solvents, for example, heptane, iso-octane, benzene or toluene, are preferred. Since many of the zirconium complexes which may be used in our process are thermally unstable, the reaction temperature should be maintained low enough to allow interaction with the hydroxylic groups of the siloxanediol while avoiding decomposition of the complex. With some complexes, temperatures below 0° C. are required.

Preferably, when polymerisation is to be performed in the liquid phase, the catalyst components are reacted together in the polymerisation vessel. The catalyst components may be admixed in any order. However the activity of our catalysts may be enhanced if the zirconium complex is contacted with the olefin to be polymerised prior to addition of the siloxanediol, and such procedure may thus be preferable.

While the above discussion has referred to use of a single zirconium complex, it is within the scope of our invention to use mixtures of more than one zirconium complex.

Similarly, while 1,1,3,3 - tetraphenylsiloxane-1,3-diol must be present, other organo-silicon compounds may also be added, for example to modify the molecular weight distribution of the product polymer.

A particularly preferred mono-olefin for use in the process of our invention is ethylene, which may be polymerised alone or with other olefinically unsaturated monomers, for example, propylene, butenes, hexenes, decenes, butadiene or styrene.

Polymerisation processes according to our invention may be carried out by techniques generally used for free radical initiated polymerisation or for polymerisation processes of the type using Ziegler catalysts.

The choice of conditions of pressure and temperature will vary with factors such as the nature of the monomer and initiator, and whether bulk or diluent polymerisation is used.

For example, when ethylene is polymerised, pressures from sub-atmospheric to several thousand atmospheres may be used. Low pressure (say from 0.1 to 30 kg. cm.$^{-2}$) and intermediate pressure (say from 30 to 300 kg. cm.$^{-2}$) polymerisations may be carried out using conventional equipment; but very high pressure polymerisation must be performed using suitable specialised reactors and pumping equipment. If very high pressures are used, it is preferred that conditions are such that the ethylene feed and polyethylene produced are maintained in a single fluid phase, i.e. the pressure should exceed 500 kg. cm.$^{-2}$, preferably 1000 to 3000 kg. cm.$^{-2}$., and the temperature should be greater than 125° C., say 140° C. to 300° C. This type of process is usually operated in a continuous manner.

Except for the polymerisation of ethylene at high pressure, the reaction may be carried out in the liquid or gaseous phase. However, it is preferred that the monomer is used in liquid form and therefore, if it is not liquid under the polymerisation conditions, it is preferred to dissolve it in a suitable solvent, which should also dissolve the catalyst components. Examples of suitable solvents are aliphatic or aromatic hydrocarbons; for instance pentane, hexane, heptane, octane, benzene, toluene, and mixtures thereof.

Chain transfer agents may be used in polymerisations according to our invention, and when ethylene is polymerised, their use is normally desirable, as the polyethylene produced in the absence of a chain transfer agent is of very high molecular weight. Hydrogen may conveniently be used, in accordance with usual practice. Some solvents may also act as chain transfer agents.

The process is preferably effected under an atmosphere free of oxygen, for example under an atmosphere of an inert gas, e.g. nitrogen, or of the monomer to be polymerised. It is also preferred to effect the process under substantially anhydrous conditions in vessels that have been carefully dried before use and using dry solvents.

It has been found that in some instances our catalyst compositions are unexpectedly active in the polymerisation of mono-olefins, particularly ethylene. It is possible for the zirconium complex itself to have very low activity, but for the equivalent composition with 1,1,3,3-tetraphenylsiloxane-1,3-diol to possess considerable activity under the same polymerisation conditions.

Suitable proportions of zirconium complex and siloxanediol in the reaction medium may be readily found by routine experiment. Catalytic activity may be enhanced by using an excess of siloxanediol over that required to react with the zirconium complex. However, activity may fall off if too great an excess is employed. For ethylene polymerisations performed at ethylene partial pressures of about 1 atmosphere, a convenient molar ratio of siloxanediol to zirconium complex is from 1:3 to 3:1, preferably 1:1 to 3:1. When the ethylene partial pressure is raised to 10 atmospheres, it is preferred to use a molar ratio of 2:1.

Unlike the position with Ziegler catalysts, the catalytic activity of our compositions may fall with rise in temperature, and for low pressure polymerisations it is preferred to operate below about 60° C., for example, −10° C. to 60° C., preferably below about 20° C., but it is not necessary to control the temperature precisely. In any event, maximum catalyst activity may result if the catalyst is kept at a temperature not exceeding 0° C. at least until after commencement of polymerisation.

In order to ensure maximum activity of the catalyst, it is desirable for the composition to be freshly prepared. A convenient batch reaction procedure is to charge a reaction vessel with the monomer and a solution of the zirconium complex and then to add the required amount of siloxanediol. It is also possible to incorporate one of the catalyst components into the monomer stream as it is fed into the reaction vessel. This latter procedure is particularly convenient when polymerisation is performed continuously.

After completion of reaction, catalyst residues may be destroyed in conventional manner for organo-metallic catalysts, for example, by washing with alcohol.

The invention is illustrated by the following examples, in which catalyst activities are quoted as grams of ethylene consumed/m. atom of zirconium/atmosphere/hour. Melt flow indices were measured using the procedure of ASTM D1238–65 T and a 2.16 kg. load.

EXAMPLES 1–17

A number of ethylene polymerisations were performed using the following procedure.

1,1,3,3-tetraphenylsiloxane-1,3-diol, as a 0.1 M solution in degassed purified toluene, was injected into purified toluene in a glass reactor under an atmosphere of dry, purified ethylene. This injection was followed by injection of a toluene solution of a zirconium complex, the amounts of the two injections being adjusted so as to give the required concentration of each component, calculated on the basis of the total solution. The injections were performed at 0° C. and, as the exothermic reaction proceeded, the temperature was allowed to rise to the indicated value. The contents of the reactor were stirred and ethylene supplied as required in order to maintain the pressure at 1 atmosphere. Ethylene consumption over an 8 minute period was measured every 4 minutes, and the calculated catalyst activity was plotted as a function of time. After 1 hour reaction was stopped by injecting methanol, and the product polymer was removed from the reaction mixture by filtration.

The results are shown in Table I (below).

For comparison, the above procedure was repeated using tetrabenzylzirconium ($1 \times 10^{-3}$ M) in the absence of siloxanediol. At various temperatures between 0° C. and 60° C., the catalyst activity ranged from 0.2 to 0.5.

Similarly tetrakis($\pi$-allyl)zirconium ($5 \times 10^{-3}$ M) at 0° C.–60° C. had an activity of about 0.5 in the absence of siloxanediol.

TABLE I

| Example | Siloxanediol concentration | Zirconium complex | Concentration of zirconium complex | Temperature, °C. | Maximum catalyst activity |
|---|---|---|---|---|---|
| 1 | $1 \times 10^{-3}$ M | Tetrabenzyl zirconium | $3 \times 10^{-3}$ M | 0 | 3 |
| 2 | $1 \times 10^{-3}$ M | ....do.... | $1 \times 10^{-3}$ M | 0 | 20 |
| 3 | $2 \times 10^{-3}$ M | ....do.... | $1 \times 10^{-3}$ M | 0 | 40 |
| 4[a] | $3 \times 10^{-3}$ M | ....do.... | $1 \times 10^{-3}$ M | 0 | 80 |
| 5[b] | $5 \times 10^{-3}$ M | ....do.... | $1 \times 10^{-3}$ M | 0 | 0 |
| 6 | $1 \times 10^{-3}$ M | ....do.... | $3 \times 10^{-3}$ M | 20 | 3 |
| 7 | $1 \times 10^{-3}$ M | ....do.... | $1 \times 10^{-3}$ M | 22 | 27 |
| 8 | $1 \times 10^{-3}$ M | ....do.... | $1 \times 10^{-3}$ M | 20 | 22 |
| 9[c] | $1 \times 10^{-3}$ M | ....do.... | $1 \times 10^{-3}$ M | 20 | 10 |
| 10 | $3 \times 10^{-3}$ M | ....do.... | $1 \times 10^{-3}$ M | 20 | 40 |
| 11 | $1 \times 10^{-3}$ M | ....do.... | $3 \times 10^{-3}$ M | 20 | 3 |
| 12 | $1 \times 10^{-3}$ M | ....do.... | $3 \times 10^{-3}$ M | 60 | 1 |
| 13 | $3 \times 10^{-3}$ M | ....do.... | $1 \times 10^{-3}$ M | 60 | 8 |
| 14 | $1 \times 10^{-3}$ M | Tribenzyl zirconium chloride | $1 \times 10^{-3}$ M | 0 | 8 |
| 15 | $3 \times 10^{-3}$ M | ....do.... | $1 \times 10^{-3}$ M | 0 | 5 |
| 16 | $1 \times 10^{-3}$ M | Tetrakis($\pi$-allyl)zirconium | $1 \times 10^{-3}$ M | 20 | 6 |
| 17 | $1 \times 10^{-3}$ M | ....do.... | $1 \times 10^{-3}$ M | 60 | 2 |

[a] A repeat of this experiment gave an activity of 40.
[b] This example shows the adverse effect of too great a proportion of siloxanediol.
[c] Catalyst components mixed in toluene under an atmosphere of nitrogen and allowed to stand for 1 hour before admission of ethylene.

EXAMPLES 18–25 (For comparison)

The procedure of Examples 1–7 was repeated using tetrabenzylzirconium (except for Example 18 where tetrakis($\pi$-allyl) zirconium was employed) and different organo-silicon compounds. The concentration of zirconium complex was $1 \times 10^{-3}$ M except where indicated.

The results are shown in Table II.

TABLE II

| Example | Organo-silicon compound | Concentration | Temperature, °C. | Maximum catalyst activity |
|---|---|---|---|---|
| 18[a] | 1,1,3,5,5-hexaphenyltrisiloxane-1,5-diol | $1 \times 10^{-3}$ M | 20 | 2 |
| 19 | ....do.... | $1 \times 10^{-3}$ M | 25 | 1 |
| 20[b] | Triphenylsilanol | $2 \times 10^{-3}$ Z | 20–60 | 0 |
| 21[b] | ....do.... | $1 \times 10^{-3}$ M | 20–80 | 0 |
| 22[b] | ....do.... | $6 \times 10^{-3}$ M | 20–80 | 0 |
| 23[b] | Diphenylsilanediol | $1 \times 10^{-3}$ M | 20–40 | 0 |
| 24[b, c] | 1,1,3,3,tetramethylsilozane-1,3-diol. | $5 \times 10^{-3}$ M | 20–60 | 0 |
| 25[b, d] | ....do.... | $2.5 \times 10^{-3}$ M | 20–60 | 0 |

[a] Zirconium complex—tetrakis($\pi$-allyl)zirconium.
[b] A number of runs were performed at different temperatures within the indicated range.
[c] Concentration of tetrabenzylzirconium: $5 \times 10^{-3}$ M.
[d] Concentration of tetrabenzylzirconium: $2.5 \times 10^{-3}$ M.

EXAMPLES 26–45

A number of batch polymerisations were performed under pressure. Except where indicated the general procedure was as follows. A stainless steel autoclave was half-filled with dry toluene. To this was added the appropriate amount of 1,1,3,3-tetraphenylsiloxane-1,3-diol, followed by tetrabenzyl zirconium, and the autoclave was pressurised with dry ethylene and hydrogen or with ethylene alone. The pressure was maintained during polymerisation by the addition of ethylene. The autoclave contents were stirred and polymerisation was allowed to continue for 1 hour, when the autoclave was vented. The polymer was dried and its melt flow index (MFI) and flow ratio measured.

The results are shown in Table III.

ene. Tetrabenzyl zirconium was added, in the proportion of 0.32 mmoles per litre of toluene. The autoclave was pressurised with ethylene (10 atmospheres) and hydrogen (20 atmospheres). After the pressure had been maintained for 40 minutes, 1,1,3,3-tetraphenylsiloxane-1,3-diol (0.46 mmoles per litre of toluene) was added and the

TABLE III

| Example | Siloxanediol concentration | Concentration of tetrabenzylzirconium | Temperature | Ethylene pressure (atmospheres) | Hydrogen pressure (atmospheres) | Average catalyst activity | M.F.I. | Flow ratio |
|---|---|---|---|---|---|---|---|---|
| 26 a b | $4 \times 10^{-4}$ M | $4 \times 10^{-4}$ M | 10 to 17° C | 10 | 10 | 18 | 0.024 | 19 |
| 27 a | $4 \times 10^{-4}$ M | $4 \times 10^{-4}$ M | 0 to 24° C | 10 | 20 | 31 | 0.003 | 5 |
| 28 a | $4 \times 10^{-4}$ M | $4 \times 10^{-4}$ M | 0 to 10° C | 10 | 20 | 20 | 0.15 | 50 |
| 29 | $4 \times 10^{-4}$ M | $4 \times 10^{-4}$ M | −5 to 5° C | 10 | 20 | 5 | 0.15 | 49 |
| 30 c | $4 \times 10^{-4}$ M | $4 \times 10^{-4}$ M | 10 to 20° C | 10 | 20 | 20.5 | 0.15 | 50 |
| 31 | $3 \times 10^{-3}$ M | $3 \times 10^{-3}$ M | 20 to 64° C | 10 | 0 | 4.6 | Not measured | |
| 32 a c | $8 \times 10^{-4}$ M | $4 \times 10^{-4}$ M | 0° C | 10 | 20 | 20 | 1.30 | 25 |
| 33 | $8 \times 10^{-4}$ M | $4 \times 10^{-4}$ M | −2 to 8° C | 10 | 20 | 35 | 0.08 | 32 |
| 34 | $6 \times 10^{-4}$ M | $4 \times 10^{-4}$ M | 0 to 10° C | 10 | 20 | 20 | 0.8 | 18 |
| 35 | $4 \times 10^{-4}$ M | $2 \times 10^{-4}$ M | 0 to 20° C | 10 | 20 | 45 | 2.84 | (l) |
| 36 | $2 \times 10^{-4}$ M | $1 \times 10^{-4}$ M | 1 to 4° C | 10 | 20 | 25 | 0.075 | 7 |
| 37 | $3 \times 10^{-4}$ M | $2 \times 10^{-4}$ M | −2 to 7° C | 10 | 20 | 19 | Not measured | |
| 38 d | $4 \times 10^{-4}$ M | $2 \times 10^{-4}$ M | 0 to 8° | 10 | 20 | 38 | Not measured | |
| 39 e | $1.2 \times 10^{-3}$ M | $4 \times 10^{-4}$ M | 0° C | 10 | 20 | 0 | | |
| 40 f | $4 \times 10^{-4}$ M | $4 \times 10^{-4}$ M | 0° C | 10 | 20 | 2 | Not measured | |
| 41 g | $8 \times 10^{-4}$ M | $4 \times 10^{-4}$ M | −2 to 2° C | 10 | 20 | 2.5 | Not measured | |
| 42 h | $8 \times 10^{-4}$ M | $4 \times 10^{-4}$ M | 0 to 7° C | 10 | 20 | 12 | 0.115 | 24 |
| 43 i | $4 \times 10^{-4}$ M | $2 \times 10^{-4}$ M | 0 to 4° C | 10 | 20 | 27 | 0.11 | 19 |
| 44 k | $4 \times 10^{-4}$ M | $2 \times 10^{-4}$ M | 3 to 22° C | 10 | 20 | 19 | 2.32 | 25 |
| 45 k | $4 \times 10^{-4}$ M | $2 \times 10^{-4}$ M | 0 to 2° C | 10 | 20 | 4 | 0.1 | 17 | a The siloxanediol contained a small amount (not exceeding 5%) of an impurity which is believed to be 1,1,3,3,5,5-hexaphenyl trisiloxane-1,5-diol.
b 0.1% ethane in residual gases.
c 0.8% ethane in residual gases.
d Polymerisation continued for 30 minutes only.
e This example shows the adverse effect of too great a proportion of siloxanediol.
f Catalyst components premixed under a nitrogen blanket and allowed to stand for 30 minutes at 20° C.
g Catalyst components premixed under a nitrogen blanket and allowed to stand for 30 minutes at 0° C.
h Catalyst components premixed under a nitrogen blanket and allowed to stand for 1 minute at 0° C.
i Catalyst components added simultaneously to the autoclave.
k Tetrabenzylzirconium added before the siloxanediol.
l Not measured.

A sample of the polyethylene produced in Example 30 was found to have the following properties:

Viscosity average molecular weight ($\overline{M}_v$) _____ 220,000
Number average molecular weight ($\overline{M}_n$) _____ 18,500
Melt flow index _____ 0.15
Flow ratio _____ 50
Density _____ g. cm.$^{-3}$ __ 0.949
Ash content _____ percent __ 0.33
Yield stress _____ kg. cm.$^{-2}$ __ 240
Break stress _____ kg. cm.$^{-2}$ __ 400
Elongation to break _____ percent __ 900
Notched impact strength _____ kg. cm.$^{-2}$ __ 39

Infra-red spectroscopy showed 0.4 methyl groups per 1000 carbon atoms. No vinyl groups could be detected.

EXAMPLES 46–48 (For comparison)

The general procedure of Examples 26–45 was repeated, with the tetrabenzylzirconium replaced by tetrabenzyltitanium.

The results are shown in Table IV.

TABLE IV

| Example | Siloxanediol concentration | Concentration of tetrabenzyltitanium | Temperature, ° C. | Ethylene pressure (atm.) | Hydrogen pressure (atm.) | Average catalyst activity |
|---|---|---|---|---|---|---|
| 46 | $8 \times 10^{-4}$ M | $4 \times 10^{-4}$ M | 0–16 | 10 | 20 | 0 |
| 47 | $4 \times 10^{-4}$ M | $4 \times 10^{-4}$ M | 70 | 10 | 20 | 0 |
| 48 | $1.6 \times 10^{-3}$ M | $8 \times 10^{-4}$ M | 20 | 10 | 20 | 0 |

For comparison, the general procedure of Examples 26–45 was repeated using further organo-silicon compounds. In no case was any polymer produced.

The organo-silicon compounds were:

Meso-1,3-dimethyl-1,3-diphenylsiloxane-1,3-diol
1,3-dimethyl-1,3-diphenylsiloxane-1,3-diol (racemic and meso forms in the proportions of 2:3)

1,1,1,3,5,5,5-heptamethyl-3-hydroxy-trisiloxane.

EXAMPLE 49

A stainless steel autoclave was half-filled with dry toluene. Tetrabenzyl zirconium was added, in the proportion of 0.32 mmoles per litre of toluene. The autoclave was pressurised with ethylene (10 atmospheres) and hydrogen (20 atmospheres). After the pressure had been maintained for 40 minutes, 1,1,3,3-tetraphenylsiloxane-1,3-diol (0.46 mmoles per litre of toluene) was added and the autoclave contents were stirred. Polymerisation was allowed to continue for 5 minutes at −6° to 7° C., when the autoclave was vented.

The catalytic activity was 150.

EXAMPLE 50

The procedure of Example 49 was repeated at a temperature of −10° to 12° C.

The catalytic activity was 91.

The product polymer had a melt flow index of 0.011 and a flow ratio of 18.

EXAMPLE 51

The procedure of Example 49 was repeated under the following conditions.

Siloxanediol concentration _____ M __ $5 \times 10^{-4}$
Tetrabenzylzirconium concentration _____ M __ $3 \times 10^{-4}$
Temperature _____ ° C __ −2 to 4

The catalytic activity was 90.

The product polymer had a melt flow index of 0.026 and a flow ratio of 18.

EXAMPLE 52

The procedure of Example 49 was repeated at a temperature of −5° C. to 5° C., except that the ethylene was not admitted to the autoclave until after addition of the siloxanediol.

The catalytic activity was 71.

The product polymer had a melt flow index of 0.038 and a flow ratio of 23.

EXAMPLE 53

The procedure of Example 49 was repeated at a temperature of −10° C. to 26° C., except that the hydrogen was not admitted to the autoclave until after addition of the siloxanediol.

A large amount of polymer was produced.

EXAMPLE 54

A solution was made up in cyclohexene of 1,1,3,3-tetraphenylsiloxane-1,3-diol ($4.9 \times 10^{-3}$ M) and tetrabenzylzirconium ($9.8 \times 10^{-3}$ M). This solution was prepared at 5–10° C. and the tetrabenzylzirconium was supplied as a 0.058 M solution in Decalin.

Deoxygenated ethylene, containing 0.8 mole percent of hydrogen, was supplied to a high pressure reactor (300 mls.) at a pressure of 2000 kg. cm.$^{-2}$ and supply rate of 2.7 kg. hr.$^{-1}$. The reactor was heated to 190° C. and the above catalyst solution was pumped into the reactor at a rate of 186 ml. hr.$^{-1}$. The temperature rose during reaction to 193° C.

Polyethylene was produced at a rate of 116 g. hr.$^{-1}$. The product polymer had a melt flow index of 3.09.

Analysis of the effluent gas from the reactor indicated that the molar percentages of materials other than ethylene were as follows:

|  | Percent |
|---|---|
| Hydrogen | 0 |
| Ethane | 0.8 |
| Butenes | 0.23 |

EXAMPLE 55

The procedure of Example 54 was repeated except that the catalyst components were dissolved in hexene-1 (0.0254 M) and the solution was diluted with 3.36 times its own volume of cyclohexene.

Reaction conditions and results were as follows:

| | |
|---|---|
| Ethylene pressure kg. cm.$^{-2}$ | 2000 |
| Hydrogen content of ethylene stream mole percent | 0.8 |
| Rate of supply of ethylene kg. hr.$^{-1}$ | 2.7 |
| Rate of supply of catalyst ml. hr.$^{-1}$ | 120 |
| Maximum reaction temperature ° C | 200 |
| Production of polyethylene g. hr.$^{-1}$ | 129 |
| Melt flow index of polyethylene | 0.033 |
| Flow ratio | 67 |

Analysis of effluent gas (mole percent)

|  | Percent |
|---|---|
| Hydrogen | 0 |
| Ethane | 0.76 |
| Butenes | 0.8 |

EXAMPLE 56

The procedure of Example 55 was repeated, except that the concentrations of the catalyst components in the hexene were:

| | |
|---|---|
| 1,1,3,3-tetraphenylsiloxane-1,3-diol M | 0.0128 |
| Tetrabenzylzirconium M | 0.0254 |

This solution was diluted with 2.44 times its own volume of cyclohexene.

Reaction conditions and results were as follows:

| | |
|---|---|
| Ethylene pressure kg. cm.$^{-2}$ | 2000 |
| Hydrogen content of ethylene stream mole percent | 0.6 |
| Rate of supply of ethylene kg. hr.$^{-1}$ | 2.5 |
| Rate of supply of catalyst ml. hr.$^{-1}$ | 186 |
| Maximum reaction temperature ° C | 192 |
| Production of polyethylene g. hr.$^{-1}$ | 84 |
| Melt flow index of polyethylene | 0.141 |
| Flow ratio | 185 |

Analysis of effluent gas (mole percent):

|  | Percent |
|---|---|
| Hydrogen | 0 |
| Ethane | 0.57 |
| Butenes | 0.2 |

What we claim is:

1. In a process for the polymerization of mono-olefins by contacting the olefin with a catalyst composition containing an organometallic zirconium complex selected from hydrocarbyl complexes of zirconium in which the valence or co-ordination requirements of the metal are satisfied by alkyl, alkenyl, or aralkyl groups which may be partially replaced by other monovalent ligands, the improvement comprising the inclusion in the catalyst composition of 1, 1, 3, 3,-tetraphenylsiloxane-1,3-diol, the molar ratio of siloxane diol to the organometallic zirconium complex being in the range from 1:3 to 3:1.

2. The process of claim 1 in which the zirconium complex and the siloxane-diol are mixed in liquid solution.

3. The process of claim 1 in which the zirconium complex is contacted with the olefin to be polymerized prior to inclusion in the catalyst composition of the siloxanediol.

4. The process of claim 1 in which the catalyst composition is maintained at a temperature not exceeding 0° C. until commencement of polymerization.

5. The process of claim 1 in which the molar ratio of siloxanediol to zirconium complex is from 1:1 to 3:1.

6. The process of claim 1 when performed in the presence of a solvent for the catalyst components and the mono-olefin.

7. The process of claim 1 in which the monovalent ligands are halogen atoms.

8. The process of claim 1 in which the organometallic zirconium complex is selected from the group consisting of tetrakis ($\pi$-allyl) zirconium, tetrakis ($\pi$-methallyl) zirconium, tetrabenzylzirconium, tetrakis (p-methyl-benzyl) zirconium, tetrakis (1-methylene-1-naphthyl) zirconium, tris ($\pi$-allyl) zirconium chloride, tris ($\pi$-allyl) zirconium bromide, tris ($\pi$ allyl) zirconium iodide, tris ($\pi$-methallyl) zirconium chloride, tris ($\pi$-methallyl) zirconium iodide, tribenzyl zirconium chloride, tribenzyl zirconium bromide and tribenzyl zirconium iodide.

9. The process of claim 1 in which all ligands of the zirconium complex are hydrocarbyl ligands.

10. The process of claim 9 in which the zirconium complex is tetrabenzylzirconium.

11. The process of claim 1 in which the mono-olefin is ethylene.

12. The process of claim 11 when performed at a temperature from −10° C. to 60° C.

13. The process of claim 12 in which the temperature is 0° C. to 20° C.

14. The process of claim 11 when performed at a pressure from 0.1 to 30 kg. cm.$^{-2}$.

15. The process of claim 1 when performed in the presence of a chain transfer agent.

16. The process of claim 15 in which the chain transfer agent is hydrogen.

References Cited
UNITED STATES PATENTS

| | | | |
|---|---|---|---|
| 3,654,254 | 4/1972 | Job et al. | 260—94.9 B |
| 3,227,702 | 1/1966 | Small et al. | 260—94.9 B |
| 2,974,133 | 3/1961 | Wiberg et al. | 260—94.9 B |
| 2,924,593 | 2/1960 | Breslow | 260—94.9 B |

JAMES A. SEIDLECK, Primary Examiner

E. J. SMITH, Assistant Examiner

U.S. Cl. X.R.

252—431 R; 260—85.3 R, 88.2 B, 93.7